United States Patent [19]
Tomioka et al.

[11] Patent Number: 6,022,123
[45] Date of Patent: Feb. 8, 2000

[54] LIGHT SOURCE DEVICE

[75] Inventors: Makoto Tomioka, Hachioji; Akira Hasegawa, Machida; Takayuki Suzuki, Hachioji; Yumi Ikeda, Fuchu, all of Japan

[73] Assignee: Olympus Optical Co., Ltd., Tokyo, Japan

[21] Appl. No.: 08/880,799

[22] Filed: Jun. 23, 1997

[30] Foreign Application Priority Data

Aug. 6, 1996 [JP] Japan ...................................... 8-207147

[51] Int. Cl.[7] ....................................................... F21V 5/04
[52] U.S. Cl. ........................... 362/244; 362/228; 362/268; 362/551
[58] Field of Search ..................................... 362/227, 228, 362/237, 244, 245, 299, 268, 551, 560, 574, 247

[56] References Cited

U.S. PATENT DOCUMENTS

| | | | |
|---|---|---|---|
| 4,183,077 | 1/1980 | Arnold | 362/245 |
| 4,464,705 | 8/1984 | Horowitz | 362/574 |
| 5,491,765 | 2/1996 | Matsumoto | 385/33 |
| 5,526,237 | 6/1996 | Davenport et al. | 362/32 |

FOREIGN PATENT DOCUMENTS

| | | |
|---|---|---|
| 106207 | 7/1987 | Japan . |
| 40223 | 2/1993 | Japan . |

*Primary Examiner*—Y. My Quach
*Attorney, Agent, or Firm*—Arnold International; Bruce Y. Arnold

[57] ABSTRACT

A light source device formed of two or more light emitting components and a collector optical component or system which collects light that is emitted from light emitting regions of the light emitting components. Light from the light emitting regions is spatially combined along a common optical axis and formed into an output beam. The light source device positions respective light emitting regions of two or more light emitting components at conjugate foci of a light collector component or system, thus providing a spatially combined output beam from the two or more light emitting regions. Thus, the intensity (i.e., brightness) of the combined output beam exceeds that produced by any individual light emitting region. Further, the light source device of the invention enables a much higher intensity, combined output beam to be produced than previously obtainable from conventional, non-laser light sources.

20 Claims, 5 Drawing Sheets

LIGHT SOURCE DEVICE

BACKGROUND OF THE INVENTION

"Light", as used herein, includes the visible, near infrared and near ultraviolet portions of the spectrum. The present invention relates to a light source device for use in any application where a higher intensity (i.e., brighter), non-laser light source than previously attainable would be a benefit. One such application is for use with endoscopes (of either the electronic endoscope, fiberscope or rigid endoscope variety). Another important application is as a light source for short range navigational aids, especially during periods of reduced visibility. In such a use, the invention could increase the minimum visibility required to land an aircraft safely, and reduce the risk of grounding or collision of ships entering harbors during periods of fog. Another important potential use of the invention is as a light source for high intensity spotlights in various commercial, law enforcement, and military applications.

In recent years, endoscopes for various types of medical diagnosis and/or treatment have been widely employed. They generally are inserted into a body cavity for observing vicera by the insertion of a long and narrow insertion component. Conventionally, light source devices for these types of endoscopes arrange reflectors that collect light emitted to the rearward direction of a lamp and reflect the light onto an end surface of a light guide. The light guide also receives part of the light emitted in the forward direction from the lamp.

However, only light within a maximum "acceptance cone" (specified by what is termed in the art as "numerical aperture") is transmitted by a light guide. Since the numerical aperture of a light guide is generally small, with this type of conventional light source, a portion of the light emitted in the forward direction from the lamp that is incident on the end of the light guide is not able to be transmitted by the light guide and is instead scattered. Thus, it is very difficult to effectively transfer the light emitted from a light source into a light guide. Therefore, various light source devices have been proposed in order to solve this problem. Of these, a few examples will be described herein.

FIG. 8 illustrates a light source device described by Japanese Utility Model Laid-Open Publication No. 62-106207. With such a light source device, in addition to a reflector 2 which is arranged in the rearward direction of the lamp 1, a reflector 3 is arranged in the forward direction of the lamp 1. Light emitted by the lamp 1 in the forward direction is reflected by the reflector 3, and is again reflected by the reflector 2 so as to be incident on an end surface of the optical fiber 4 within the maximum cone angle of acceptance, thereby raising the utilization efficiency of the light.

FIG. 9 illustrates a light source device disclosed by Japanese Patent Laid-Open Publication No. 5-40223. A lamp 1 is attached in the vicinity of a first focus position of ellipsoidal reflector 5, and a spherical, concave reflector 6 having an axial aperture 6a in the forward direction of the ellipsoidal reflector is arranged so that the center of curvature of the reflector 6 lies at or near the first focus position of the ellipsoidal reflector 5. Thus, light passing through the axial aperture 6a passes through the lens 7. Just as with the device illustrated in FIG. 8, with this lighting device the utilization efficiency of light emitted from the lamp 1 in the forward direction is also improved by arranging a reflective surface in a forward position of the lamp 1.

FIG. 10 illustrates a light source for use with an endoscope as disclosed in Japanese Patent Laid-Open Publication No. 7-175042. Such a light source is composed of a lamp 1, a reflector 8 which creates a nearly collimated luminous flux of the light from the lamp 1, and a collector lens 7 which collects the light from the reflector 8 onto an end surface of a light guide 9. By the arrangement illustrated, light from the lamp 1 can be guided onto the end surface of the light guide 9 so as to be incident within the cone angle of acceptance, as defined by the numerical aperture of the light guide.

BRIEF SUMMARY OF THE INVENTION

Although it can be said that light collected from one light source, by means of the aforementioned conventional methods, can effectively be made to be incident within the cone angle of acceptance of an end surface of a light guide, there is a limit to the increase of incident light that can be achieved with such conventional methods. With a light source device that uses only one lamp, use of a lamp with a larger electrical consumption can be considered as a possible method for increasing the amount of light incident on the end surface. However, in the case of a lamp having a filament, one with a larger electrical consumption merely has a larger emission area. Thus, the luminance itself does not change. Further, even with an arc discharge type lamp, the luminance of the light emitting region does not change appreciably as the electrical consumption is increased. For this reason, when using a lamp having a higher electrical consumption, there is almost no affect other than such a lamp can effectively illuminate a light guide end of larger area.

Therefore, in order to increase the light flux that is incident onto an end surface of a light guide, it simply becomes necessary to raise the luminance of the light source device. Similarly, in other applications where a brighter light source is needed, past advances have limited the options for improvement in performance, and it simply becomes necessary to raise the luminance of the light source device. While lasers provide a higher luminance light source than attainable with previous light sources, they have the disadvantage of being higher in relative cost and incapable of producing broad band light, as may be readily achieved with metal filament lamps and, although to a more limited extent, with arc discharge lamps. Thus, past advances in raising the luminance of conventional light sources have been directed to increasing the filament temperature. An example of this type of approach is the pervasive use of tungsten-halogen lamps in navigational aids and spotlights for high intensity, conventional light applications.

It has long been known that, given that an object and image are in media of the same index of refraction, the luminance of the object can not be increased by optical means. In some texts on optics, this is referred to as the "brightness theorem". Despite the validity of the brightness theorem, the present inventors have invented a light source device that avoids violating the brightness theorem while, at the same time, provides a higher intensity, conventional light source device than previously attained. This is accomplished by spatially combining the light emitted from two or more sources. In this way, it is the apparent luminance that is increased by optical means.

In the case of illuminating a light guide end with light from the present invention, the numerical aperture of the light guide is comparatively small. Therefore, the maximum cone angle of acceptance of the incident light that will be transmitted by the light guide is limited. Accordingly, when arranging two lamps on separate axes and condensing the light from these lamps onto an end surface of a light guide using respective collector lenses, one might expect that the luminance becomes twice that produced as when using only one lamp. However, in such case, the light beams from each lamp are not spatially combined, and the luminance itself does not change. For this reason, the light flux transmitted by the light guide will not be twice that of when using one lamp, and a large loss of usable light occurs.

Therefore, in the present invention, light from light emitting regions of two or more lamps is made to travel along a common optical axis so that the light is spatially combined. However, when arranging the light emitting regions of each lamp according to the present invention so that the light is conveyed along a common optical axis, a lens is required between each lamp. When using filament type lamps, even if a reflector is attached in the rearward direction of the lamp, the forward emitted light from the rearward lamp is eclipsed by the filament (which is not transparent) of the forward lamp. Thus, a portion of the light can not reach and be incident on an end surface of the light guide (or can not reach an output aperture of the light source device, in the case of other applications) resulting in the effectiveness of using a plurality of lamps being reduced.

In order to effectively utilize the light from the light emitting regions of a plurality of lamps, a preferred embodiment of the present invention includes a lamp type which allows the spatial combining of light from two or more lamps along a single optical axis, without light from other lamps being eclipsed. Thus, what is needed is a lamp having a transparent light emission region, and an arc discharge lamp is an example of such a lamp. More specifically, an electric arc discharge type lamp is a suitable lamp type for use in the preferred embodiments of the invention.

Therefore, the present invention considers the problems inherent in the conventional technology as described. A first object of the invention is to provide a high intensity light source device wherein individual light emitting components contribute to a spatially combined beam.

A second object of the invention is to increase the utilization efficiency of light from the individual light emitting components by using one or more lamps having a transparent light emission region, thereby providing a light source device which can supply illuminating light that is of higher intensity than that attained from any individual component and is substantially additive of the beam intensities of the individual light emitting regions of the lamps. Thus, in the event that lamps of identical luminance are used in the light source device, the spatially combined output beam will have a beam intensity that is substantially proportional to the number of lamps utilized in the light source device.

In order to achieve the above-mentioned objects of the invention, the light source device according to the present invention is comprised of two or more light emitting components and a collector optical component or system, wherein the light from the light emitting regions is spatially combined along a common optical axis.

This is accomplished by having at least one light collecting component or system and two or more light emitting components of the light source device arranged in a particular manner. The light source device according to the present invention utilizes two or more light emitting components arranged at respective conjugate foci of the light collecting component or system. As used herein "conjugate foci" of a light collecting component or system refers to points such that light from a first point is focused to a second point, and light from the second point is focused to the first point. Thus, conjugate foci of a light collecting component or system lie in respective conjugate surfaces of the light collecting component or system. This enables light from multiple light emitting components to be combined in a manner such that their individual luminance combine to form an output beam of increased brightness. In the case of using the light source device of the present invention to illuminate an end of one or more light guides, a coupling lens is arranged to condense the spatially combined output light of the light source device onto an end surface of the light guide.

The light source device according to the present invention is comprised of a plurality of light emitting regions of lamps arranged to convey light along a common optical axis. Of course, the lamps themselves need not be positioned along the same axis, so long as the light emitted by the lamps is collected by the optical system and then eventually conveyed by the optical system along a common optical axis as a spatially combined beam. It is preferred that the lamp arranged closest to an output of the light source device (where the beam intensity is greatest due to the spatial combining of the beams of the individual lamps), be a lamp having a transparent light emitting region, such as an arc discharge type lamp. This avoids eclipsing of the light output at a point where the combined beam intensity is high. In order to achieve the second object of the invention, it is necessary that at least one of the lamps have a transparent filament. This allows the light to be spatially combined without any eclipsing of the beams and results in the beam intensity of the combined beam being additive of the separate beam intensities.

DETAILED DESCRIPTION

Figure 1:
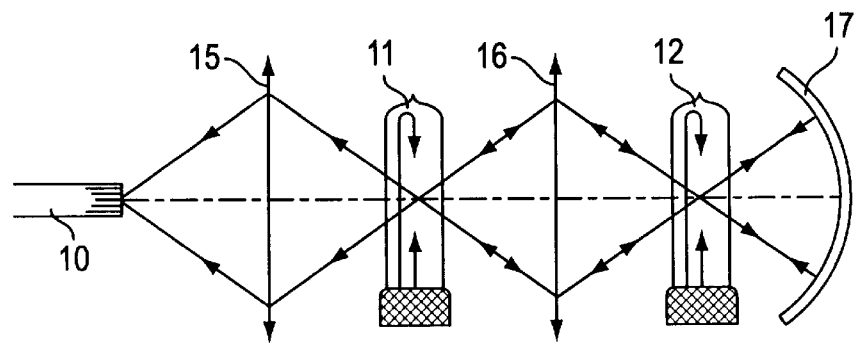
FIG. 1 is a cross-sectional view of components of a first embodiment of the invention (as well as some optional, additional components), in use illuminating an end of a single light guide.

FIG. 1 is a first embodiment of the invention, illustrating the three fundamental (i.e., most basic) components of the invention, namely, two light emitting components (such as lamps 11 and 12) and a light collector component or system (such as lens 16). These fundamental components are required components of each of the other embodiments of the invention, as will become apparent from reading the below descriptions thereof.

In addition to the above-mentioned, three fundamental components, FIG. 1 illustrates the light source of the invention in use illuminating a light guide 10 via a coupling lens 15. Further, a spherical mirror 17 is illustrated. This component serves to redirect a portion of the light originally emitted away from a single output of the light source device backwards upon itself so that said light contributes to the single output of the device, as will be described in more detail below. Although the increasing of the intensity at a single output of the light source device is highly desirable, the spherical mirror 17 is not an essential component of the invention, and indeed the light source of the invention can have two outputs simultaneously, as will be discussed.

The essence of the invention is that at least two light emitting components are arranged at the conjugate foci of a light collector component or system. In this embodiment of the invention, light emitting regions of lamps 11 and 12 are arranged at the conjugate foci of the lens 16. This causes the radiation to be combined spatially such that the apparent luminance of what appears as a single light source producing a combined beam output is higher in luminance than the actual luminance of either of the light emitting regions of lamps 11 or 12. This occurs because the light that is emitted from lamp 12 is imaged at lamp 11, and vice-versa.

Such an arrangement is especially effective for providing a light source for a narrow diameter light guide, such as for an endoscope. Thus, as illustrated in FIG. 1, a single output beam of the light source device may be condensed onto an end surface of the light guide 10 by the lens 15.

In other specific applications, the lens 15 may be positioned closer to lamp 11 so as to form collimated light, or may be omitted altogether, depending on the specific end application of the light produced by the light source device.

In addition, with the light source device of the present invention, a spherical mirror 17 may optionally be arranged as illustrated in FIG. 1, so that its center of curvature is at or near the light emitting region of the lamp 12. Accordingly, luminous flux from the lamp 11 that is emitted in the reverse direction to that of the light guide 10 is collected at the light emitting region of the lamp 12 by the light collector component 16. The luminous flux emitted towards the spherical mirror 17 by the light emitting portion of the lamp 12 is combined with the light emitted to the opposite side of the light guide 10 from the lamp 11. The combined luminous flux is reflected by the spherical mirror 17 and again collected at the light emitting portion of the lamp 12. Further, the luminous flux collected here follows the same path as the luminous flux that is emitted towards the direction of the light guide 10 from the lamp 12. Thus, it is made incident onto the end surface of the light guide 10 by the lens 15.

In this way, with the light source device of the present invention, the luminous flux emitted from each lamp in directions toward and away from light guide 10 is collected and efficiently used. More specifically, compared to conventional light source devices, the present invention provides a light source that combines beams from separate sources in a manner that makes the combined beam have an intensity (i.e., brightness) that is greater than that available from a single lamp.

With the example above, both of the light sources were lamps having a transparent light emitting region (e.g., both lamps were of the arc discharge type). However, as will be described in the following embodiments, lamps of the type which have a metal filament may also be used. In such cases, since the light passing through the light emitting region containing the filament will be eclipsed by the filament, the quantity of light which finally reaches the surface of the light guide is reduced as compared to the example in FIG. 1.

However, the lamps 11 and 12 may desirably have their center axes rotated in azimuth angle around the optical axis so that, in the case metal filament lamps are exclusively used, eclipsing of the light from one lamp by the metal filament of another lamp will be minimized. Even in the case neither lamp has a metal filament, rotating the lamps 11 and 12 in azimuth angle about the optical axis will provide a more uniform illumination of the optical fiber 10, since the projection of the light emitting regions of lamps 11 and 12 onto a plane perpendicular to the optical axis results in a light spot that is elliptical in shape rather than circular.

In case the light emitting regions of lamps 11 and 12 are of the metal filament type, a significant increase in the light flux of the combined beam entering a light guide can be achieved as compared to the prior art. Even more importantly, when arc discharge lamps are used for lamps 11 and 12, there is substantially no eclipsing of the output light. Thus, the intensity of the output beam will be substantially additive of the intensities of the individual beams of the separate light sources.

Figure 2:
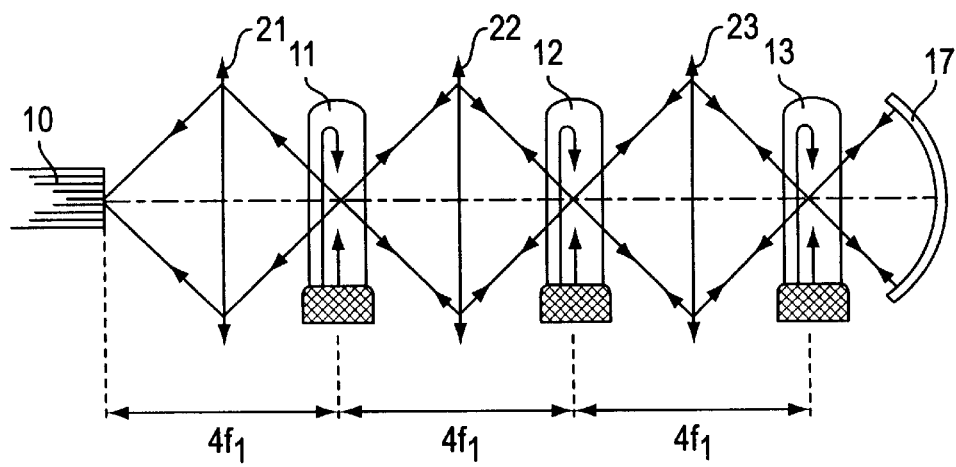
FIG. 2 is a cross-sectional view of components of a second embodiment of the invention (as well as some optional, additional components), in use illuminating an end of a single light guide.

FIG. 2 is a cross-sectional view of a second embodiment of the invention, in use similarly to that of the first embodiment. In this embodiment, another lamp 13 and lens 23 have been added in order to increase the light output of the device. The light emitting regions of the lamps 11, 12, and 13 are of the arc discharge type and are arranged respectively on a common optical axis. The lens 21 is arranged between the light guide 10 and the lamp 11. In a similar manner, the lenses 22 and 23 are respectively arranged between the lamps 11,12 and between the lamps 12,13. The end surface of the light guide 10 and the light emitting region of the lamp 11 are arranged to be at conjugate foci of the lens 21. Similarly, the light emitting region of the lamp 11 and the light emitting region of the lamp 12, as well as the light emitting region of the lamp 12 and the light emitting region of the lamp 13 are also maintained in conjugate relationship through the lens 22 and the lens 23, respectively.

Additionally, the light source device of this embodiment employs positive lenses 21, 22 and 23 having an identical focal length $f_1$. Of course, it is not required that each lens have the same focal length. However, for the specific embodiment illustrated, wherein the lenses 21, 22 and 23 are spaced equally, the distance between the end surface of the light guide 10 and the light emitting region of the lamp 11, as well as the distance between the light emitting regions of the lamps, is four times that of $f_1$ (i.e., $4f_1$) in order for the light emitting components and the end surface to be positioned in conjugate relationship. Also, this results in the most compact arrangement. Further, spherical mirror 17 is optionally but desirably arranged at the rear of the lamp 13 so that the center of curvature of the spherical mirror will be at or near the light emitting region of the lamp 13.

According to this construction, the light source device of this embodiment spatially combines the light emitted in directions away from the light guide 10 with that emitted toward the light guide 10 for each of the lamps 11, 12 and 13. This enables the light guide 10 to be supplied with a light flux that is much higher than that achieved with a conventional light source device. And, of course, the number of lamps can exceed three in number.

In the case of using an arc discharge lamp (such as a metal halide lamp) as the light emitting component, the emission region of such a lamp is shaped similarly to an ellipsoid of revolution. Thus, the projected image of the light emitting region of the lamp becomes elliptical. Because the shape of the end surface of the light guide is generally circular, in order to efficiently transfer the light that is incident onto the light guide end, it is preferred that the shape of the light spot collected onto the end surface of the light guide be circular.

Accordingly, when using arc-discharge lamps, it is also preferred to arrange each lamp so that the direction of the major axes of the ellipses (i.e., the projection of the light emitting regions onto a plane normal to the optical axis) mutually cross. As discussed above, this is easily accomplished by arranging the central cylindrical axis an of the illustrated lamps to lie at different azimuth angles about the optical axis. Such an arrangement causes the shape of the light spot incident on the end surface of the light guide to be nearly circular.

It is preferred that the azimuth crossing angles of the major axes of the light emitting components divide a circle (360 degrees) into equal parts according to the number of lamps. More specifically, in the case of using three lamps, the three major axes of the ellipses should cross at 120 degrees. However, it is still effective even if the major axes of just two lamps are arranged at different azimuths about the optical axis in a mutually crossing manner.

Further, in the case where arc discharge lamps are used, and the electrode spacings are different (so as to form arcs of different length), the lamp with the largest electrode spacing should be positioned nearest the light guide. In this way any eclipsing of the collected luminous flux that is directed through the light emitting region of the lamp nearest the light guide is minimized.

Furthermore, the light source device of the present invention makes possible the adjustment of the color temperature of the light emitted to the observation subject by using, in combination, lamps which have different spectral emission distributions. Also, when utilizing lamps which emit line spectra having coherency, interference among the luminous fluxes emitted from each of the lamps can be reduced by using different types of metal halide lamps, in combination.

Moreover, with the light source device of the present invention, it is possible to add and remove lamps from the system, thus making the selective use, in combination, of lamps having different intensities as well as different spectral distributions. Thus, the light source of the present invention can readily be adjusted to supply illuminating light over a broad range of intensities, from high intensity to low intensity. It is also possible to select the output intensity of the entire light source device almost independently of the resistance or output intensity of a particular, utilized lamp.

The light source device of the present invention relays the luminous flux which is emitted from a plurality of lamps so the heat load of the lamp nearest the output becomes the largest. Generally, a lamp having high electrical consumption is strong in terms of accommodating a high thermal load. Thus, where lamps having different electrical consumption are used, it is preferred to arrange the lamp having the largest electrical consumption (i.e. wattage) nearest the output of the light source device.

Figure 3:
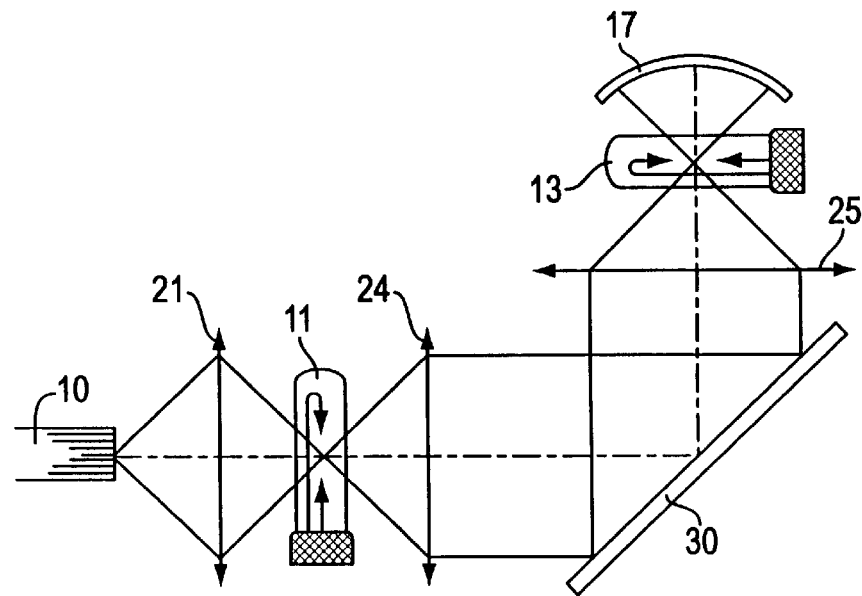
FIG. 3 is a cross-sectional view of the same components as illustrated in FIG. 1, but with a collimating lens and a folding mirror added.

Referring to FIG. 3, a variation of the first embodiment of the invention illustrated in FIG. 1, is shown. Although it is required that the light emitting region of each of the lamps be arranged along the optical axis, it is of course possible to fold or bend the optical axis by arranging a mirror or prism in the light path, as illustrated in the figure using a mirror. The light emitting region of the lamp 11 is made conjugate with the end surface of the light guide 10 by lens 21, and the light emitting region of the lamp 11 is made conjugate with the light emitting region of the lamp 13 through the lenses 24 and 25. In the illustration, the light in the interval between the lenses 24 and 25, where the mirror 30 is interposed, is collimated due to lens 24 being positioned one focal length from lamp 11 and by lens 25 being positioned one focal length from lamp 13. As those of ordinary skill in the art will appreciate, the lenses 21, 24 and 25 need not be of the same focal length, nor is it required that the mirror 30 be located in collimated light. For example, lens 25 can be omitted without appreciably affecting the operation of the device, providing that the conjugate relationship of the lamps 11 and 13 are maintained by adjusting the position of the lens 24 and the lamp 13.

Figure 4:
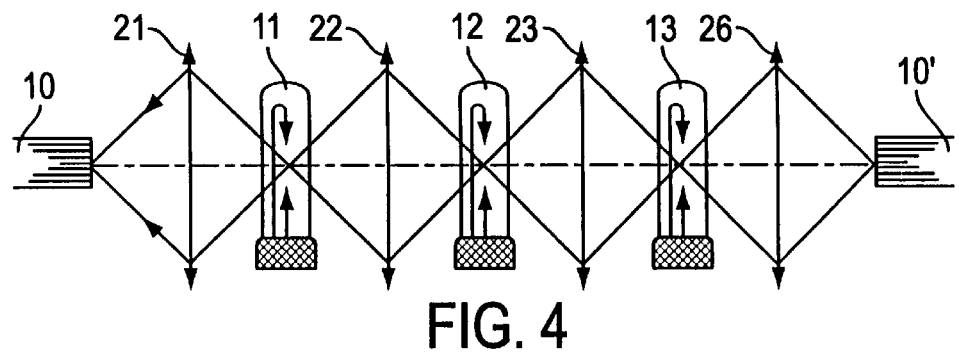
FIG. 4 is a cross-sectional view of the same embodiment of the invention illustrated in FIG. 2, but this time in use illuminating two light guide ends simultaneously via respective coupling lenses.

FIG. 4 illustrates the second embodiment of the invention, in use illuminating two light guides 10 and 10'. In this case, the optional spherical reflector 17 that was illustrated in FIG. 2 has been omitted. Here, lenses 21 and 26 direct two outputs of the light source device as converging light toward beam waists so that the light can enter ends of the light guides 10 and 10'. The lens 21 and the light guide 10 are positioned so that the end of the light guide 10 is at a conjugate point to the light emitting portion of lamp 11. Similarly, the lens 26 and the light guide 10' are positioned so that the end of the light guide 10' is at a conjugate point to the light emitting portion of lamp 13. Assuming equal intensity lamps are used, and because the light attenuation associated with using the spherical reflector 17 has been avoided, the light intensity produced by this arrangement and input onto the end of each of light guides 10 and 10' is about the same as the intensity produced on the end of light guide 10 of FIG. 1.

Figure 5:
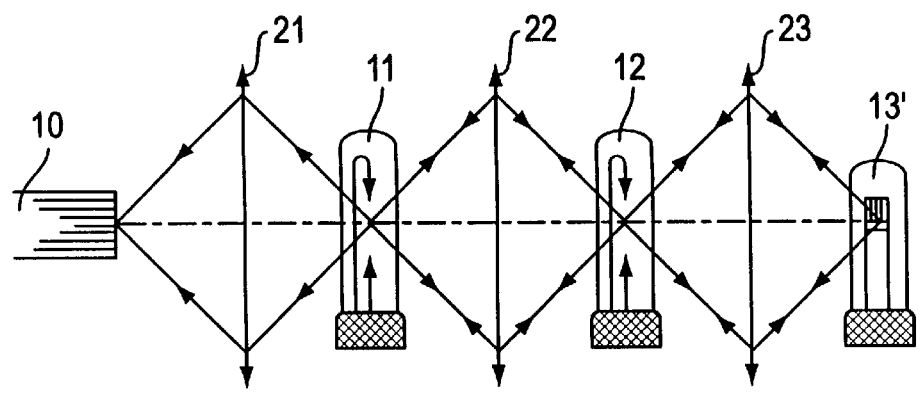
FIG. 5 is a cross-sectional view of components of a third embodiment of the invention, in use illuminating a light guide end via a coupling lens.

FIG. 5 illustrates a third embodiment of the invention. This embodiment is an example of the light source device comprising two different types of lamps, in combination. In the specific example illustrated, two arc discharge lamps 11, 12 and a metal filament type lamp 13' are utilized. Comparing this arrangement to that of FIG. 2, it is readily seen that the lamp 13 and spherical reflector 17 of FIG. 2 have been replaced by metal filament type lamp 13'. In the light source device of this embodiment, since the one portion of the luminous flux which is collected onto the filament of the lamp 13' through the lens 23 is reflected at the filament and returned, this embodiment effectively utilizes the light which is emitted away from the light guide 10 by the lamps 11 and 12, but without using a spherical reflector. Therefore, even though the spherical reflector 17 is not employed, a similar effect to the light source device of FIG. 2 can be obtained.

Figure 6:
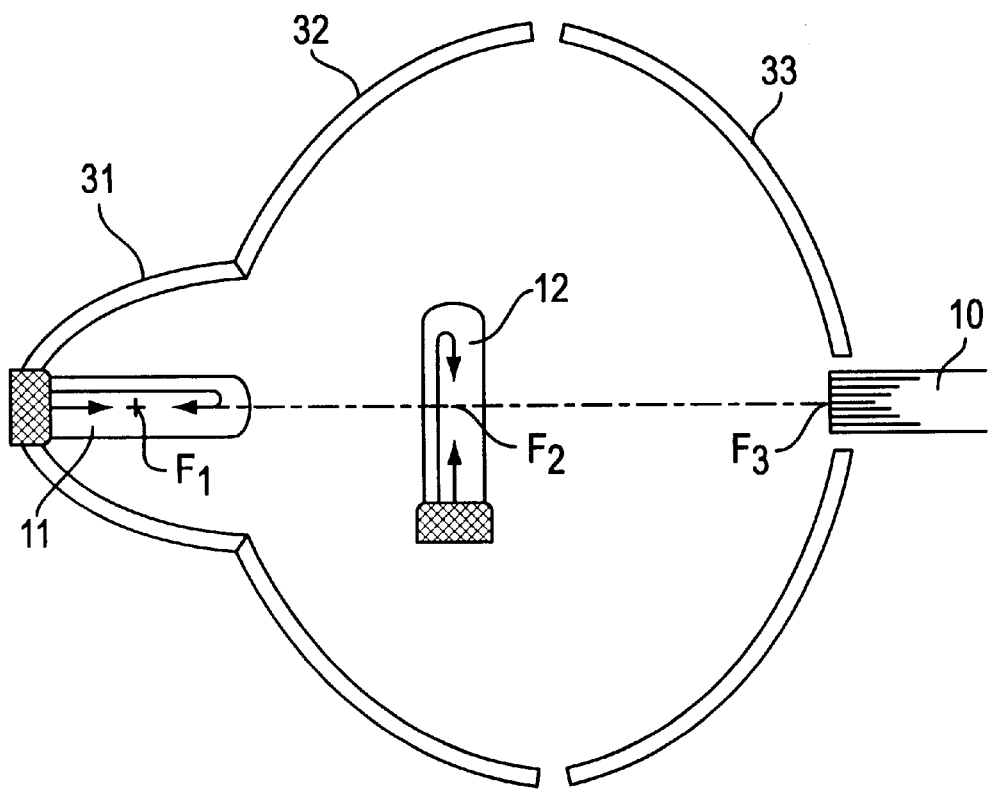
FIG. 6 is a cross-sectional view of components of a fourth embodiment of the invention, in use illuminating a single light guide via two reflectors.

The light source devices indicated previously exclusively employ lenses as light collection elements. In a fourth embodiment of the invention, illustrated in FIG. 6, reflectors are instead exclusively employed to collect the light. Referring to FIG. 6, a collector optical system is composed of ellipsoidal reflectors 31, 32 and of spherical reflector 33. The two conjugate foci of ellipsoidal reflector 31 are the points $F_1$ and $F_2$, thereby defining an optical axis. In addition, the two conjugate foci of ellipsoidal reflector 32 are at points $F_2$ and $F_3$. Thus the two ellipsoidal reflectors 31,32 are arranged symmetrically around an optical axis with the focal point $F_2$ common to each. Lamp 11 is located with its light emitting portion at $F_1$, and lamp 12 is located with its light emitting portion at $F_2$. On the other hand, spherical reflector 33, having an axial aperture and a center of curvature located at or near point $F_2$, collects light from lamp 12 emitted in the forward direction and reflects it back through the point $F_2$ so as to be incident on elliptical reflector 32 and then be reflected to point $F_3$. In the illustrated embodiment of FIG. 6, an end of a light guide 10 is positioned at $F_3$ to receive the output light.

In the light source device of this embodiment, a portion of the luminous flux which is emitted from the light emitting region of lamp 11 (positioned at $F_1$) is reflected by the ellipsoidal reflector 31 to point $F_2$. This luminous flux is combined with the luminous flux emitted from the light emitting region of the lamp 12 at $F_2$, and travels to spherical reflector 33, where it is reflected back through the point $F_2$ so as be reflected again by ellipsoidal reflector 32 towards focal point $F_3$. A portion of the light from lamp 11 emitted in the forward direction combines with a portion of the light emitted from lamp 12 in the forward direction and directly travels to the output of the light source device. On the other hand, a portion of the light emitted from lamp 12 in the rearward direction is incident on ellipsoidal reflector 32, where it is reflected to $F_3$. A portion of the light emitted in the forward direction from lamp 12 is collected by spherical reflector 33, which reflects the light back through point $F_2$ so as to be incident on ellipsoidal reflector 32 and thus be reflected to point $F_3$.

Therefore, the light source device of the present embodiment can effectively utilize the luminous fluxes emitted from each of the lamps and, in the same way as the devices indicated in each of the previously discussed embodiments, can provide a light intensity higher than can be achieved with a single light source.

Figure 7:
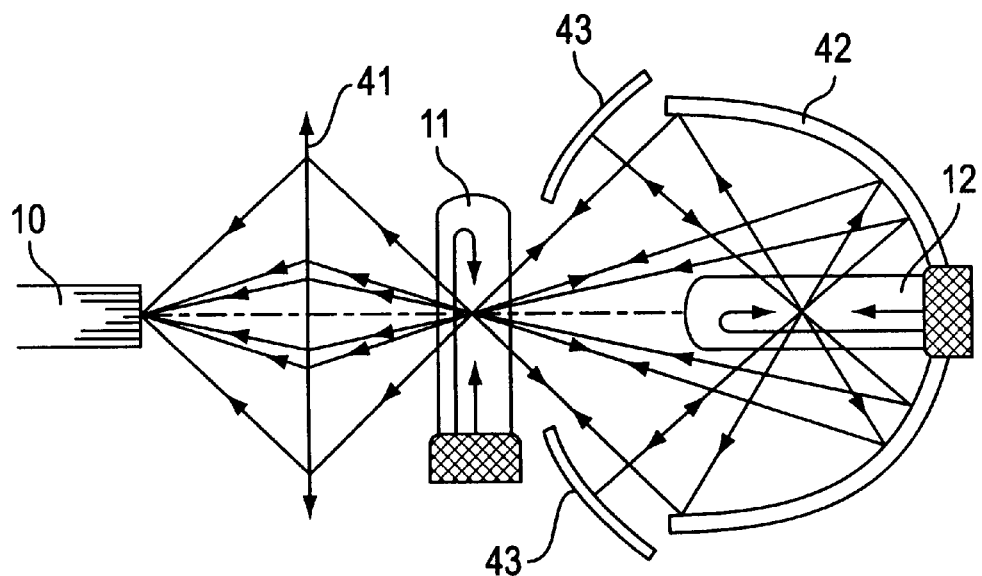
FIG. 7 is a cross-sectional view of components of a fifth embodiment of the invention, for use in illuminating a single light guide.
Figure 8:
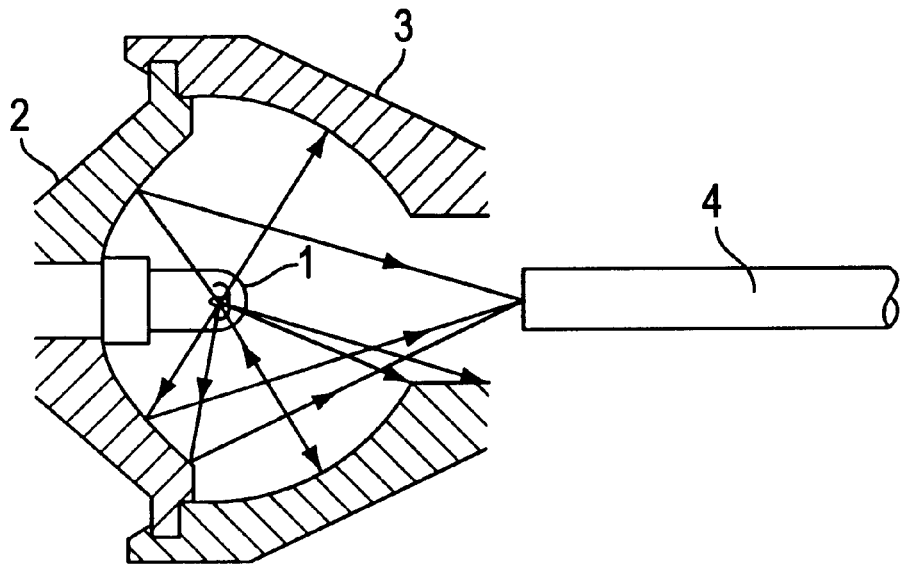
FIG. 8 is a cross-sectional view of components of a light source device of the prior art, in use illuminating an optical fiber.
Figure 9:
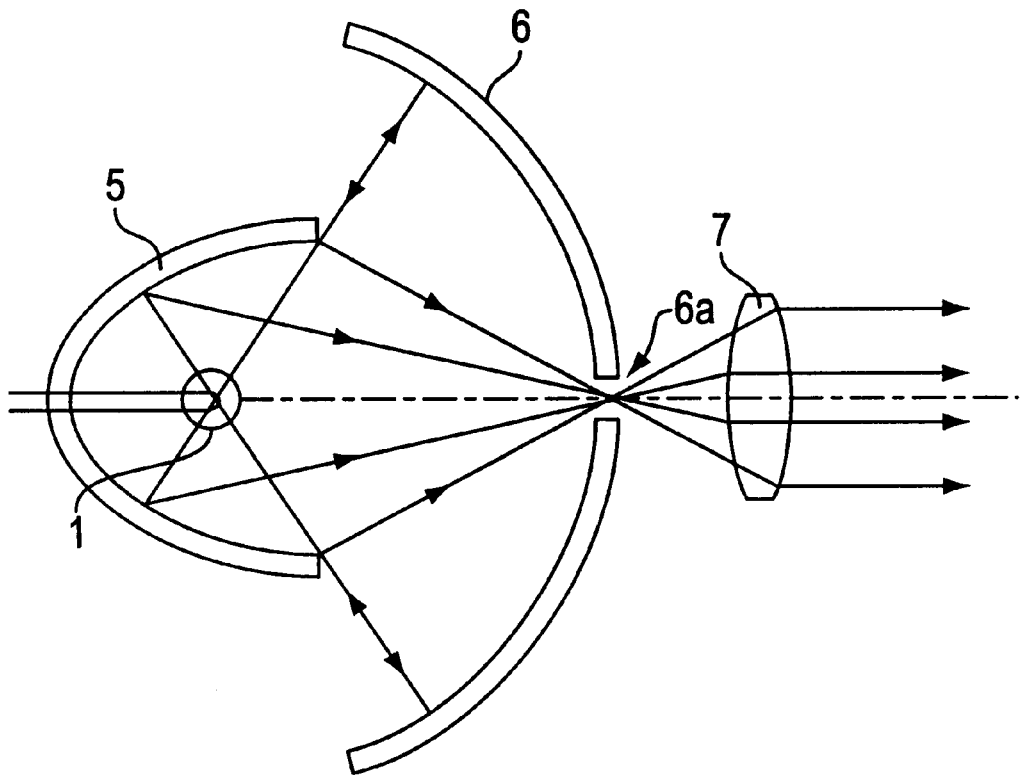
FIG. 9 is a cross-sectional view of components of another light source device of the prior art, in use with a lens to form a nearly collimated output beam; and, FIG. 10 is a cross-sectional view of components of yet another light source device of the prior art, in use with a light guide.
Figure 10:
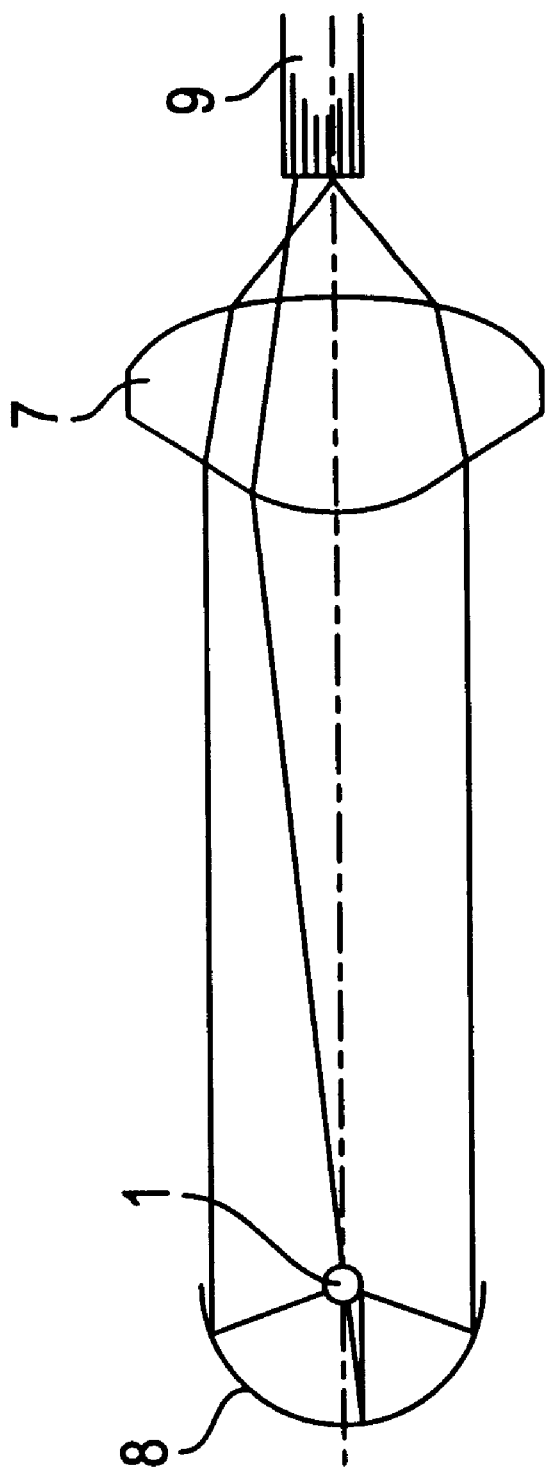

FIG. 7 illustrates a fifth embodiment of the invention, which employs both a transmissive light collecting element and reflective light collecting elements, in combination, for use in illuminating an end of a light guide. The light source device of this embodiment includes the lamps 11 and 12, having their light emitting regions arranged on the optical axis in the orientations indicated, reflectors 42 and 43 and lens 41. Lens 41 is located between the lamp 11 and light guide 10. In the illustrated example, an end of a light guide 10 is positioned at the output of the device so as to receive radiation incident thereon. Ellipsoidal reflector 42 is arranged so that the position of one of its focal points is at or near the light emitting region of the lamp 12. A spherical reflector 43 is arranged at the front side of the lamp 12 in order to send back once again to the light emitting region of the lamp 12 that luminous flux emitted from the light emitting region to the front side of the lamp 12. This is accomplished by having the center of curvature of the spherical reflector 43 lie at or near the light emitting region of lamp 12.

In the light source device of this embodiment, a portion of the luminous flux from lamp 11 that is emitted in the general direction of an output beam waist (i.e., towards the end of light guide 10, which is positioned at the single output beam waist of this embodiment of the invention) is collected and redirected by the lens 41. On the other hand a portion of the luminous flux emitted from the lamp 11 in a general direction away from the output of the device is directed towards the light emitting region of the lamp 12 by the ellipsoidal reflector 42, and combined with a portion of the luminous flux emitted from the light emitting region of the lamp 12.

After this, it is reflected once more by ellipsoidal reflector 42 and passes to the output beam waist via the light emitting portion of lamp 11 and the lens 41. A portion of the light emitted from lamp 12 in the general direction of the output of the light source device is collected by spherical reflector 43, having its center of curvature at or near the light emitting portion of the lamp 12. This light is then reflected back through the light emitting portion of lamp 12, where it combines with light emitted from the lamp 12 toward a portion of the reflector 42 and is then reflected by reflector 42 through the light emitting portion of lamp 11. This light and a portion of the light from lamp 11 emitted in the general direction of the output is then collected by the lens 41 and directed by it to the output beam waist.

Of course, it is possible to achieve still higher intensities of the output beam of this embodiment of the invention by merely adding additional lamps and lenses in conjugate relationship. Additionally, with the light source device of this embodiment, it is also possible to instead employ, in combination, a parabolic reflector and lens instead of the ellipsoidal reflector 42 and lens 41.

The invention being thus described, it is obvious that the invention may be used in ways other than that specifically illustrated in the above figures. For example, the device will find applicability where ever a high intensity, relatively inexpensive, low maintenance, light source is needed. In addition to the illustrated uses of illuminating an end of an optical light guide, the light source of the invention should be useful at airports and harbors for landing lights and beacons during periods of reduced visibility, as well as in higher intensity spotlights than heretofore available.

Further, the number, type and arrangement of lamps and light collectors employed in the light source of the invention may be increased and/or varied in many ways from those specifically illustrated, without departing from the spirit of the invention. For example, the mirror 30 of FIG. 3 could be reflective only for the radiation spectrum from lamp 13, while being transmissive for other wavelengths so as to enable one or more additional light sources of different spectral content to be arranged similarly in the direction to the right of mirror 30 and in conjugate relationship to the lamp 11. Other additions or modifications from the embodiments of the invention specifically illustrated, such as: varying the focusing power of one or more light collectors; using a lens to shape the output beam of the device such as by varying the object and image distance in order to change the cone angle of the output or to form a collimated output, are to be regarded as within the spirit and scope of the invention. Further, all such modifications as would be obvious to one skilled in the art are intended to be included within the scope of the following claims.

What is claimed is:

1. A light source device comprising:
   a first light emitting component and a second light emitting component, both arranged along an optical axis; and,
   a first light collecting means arranged along said optical axis intermediate the first light emitting component and the second light emitting component, with said first light emitting component and said second light emitting component having respective light emitting regions located at conjugate foci of said first light collecting means;
   whereby light from the first and second light emitting components form a spatially combined beam of higher intensity than any beam produced individually by either the first light emitting component or the second light emitting component.

2. The light source device according to claim 1, wherein one of the light emitting regions is substantially transparent to wavelengths of light produced by another of the light emitting regions.

3. The light source device according to claim 2, wherein at least one light emitting region is a light emitting region of an arc discharge lamp.

4. The light source device according to claim 1, wherein at least two of the light emitting regions are substantially transparent to wavelengths of light produced by said light source device.

5. The light source device according to claim 4, wherein said at least two of the light emitting regions that are substantially transparent are light emitting regions of arc discharge lamps.

6. The light source device according to claim 1, and further including a reflector positioned to reflect light from said first light emitting component to a light collecting component of said first light collecting means.

7. The light source device according to claim 1, wherein at least one of the first and second light emitting components is a metal filament lamp.

8. The light source device according to claim 1, and further including a second light collecting means and a third light emitting component arranged along the optical axis so that the second light collecting means is intermediate said second light emitting component and said third light emitting component, and wherein the second light emitting component and the third light emitting component are positioned at conjugate foci of the second light collecting means.

9. The light source device according to claim 8, in combination with:

a third light collecting means arranged along the optical axis to receive the spatially combined beam and to converge it towards a beam waist; and, a light guide having an end positioned to receive a substantial portion of said light that converges toward a beam waist.

10. The apparatus according to claim 9, in combination with:

a fourth light collecting means arranged along the optical axis so as to simultaneously form another beam of spatially combined light that converges to a beam waist; and, another light guide having an end positioned to receive a substantial portion of the light in the other beam that converges to a beam waist.

11. The light source device according to claim 1, in combination with:

another light collecting means which receives the spatially combined beam and forms a combined beam that converges toward a beam waist; and, a light guide positioned with an end thereof to receive a substantial portion of the combined beam that converges toward a beam waist.

12. The apparatus according to claim 11, in combination with a reflector positioned to reflect light from said first light emitting component to the first light collecting means.

13. The apparatus according to claim 12, wherein at least one of said light emitting components is an arc discharge lamp.

14. The apparatus according to claim 12, wherein at least two of said light emitting components comprise lamps with light emitting regions that are substantially transparent to wavelengths produced by said light source device.

15. The apparatus according to claim 14, wherein said at least two lamps are arc discharge lamps.

16. The apparatus according to claim 12, wherein at least one light emitting component is a metal filament lamp.

17. The light source device according to claim 1, wherein the light emitting components are electric lamps of different electrical consumption, and wherein the electric lamp having the larger electrical consumption is arranged nearer an output of said light source device.

18. The apparatus according to claim 12, wherein the light emitting components are electric lamps of different electrical consumption, and wherein the electric lamp having the larger electrical consumption is arranged nearer an output of said light source device.

19. A method of forming a combined beam by spatially combining light from two or more light emitting components, said combined beam being of greater brightness than emitted by any individual one of the two or more light emitting components, said method comprising the step of:

(a) positioning the two or more light emitting components and a first light collecting means along an optical axis so that light emitting regions of a first light emitting component and a second light emitting component are respectively located at conjugate foci of the first light collecting means, to thereby form a combined beam.

20. The method according to claim 19, further including the steps of:

(b) forming said combined beam into an output beam that converges toward a beam waist; and, (d) positioning an end of a light guide so that a substantial portion of the combined beam is incident on an end surface of said light guide.

* * * * *

UNITED STATES PATENT AND TRADEMARK OFFICE
CERTIFICATE OF CORRECTION

PATENT NO : 6,022,123
DATED : Feb. 8, 2000
INVENTOR(S): Tomioka et al.

It is certified that error appears in the above-identified patent and that said Letters Patent is hereby corrected as shown below:

In column 7, line 21, "axis an of" should be - -axis of - -.

In column 9, line 19, "so as" should be - - so as to - -.

In claim 20, line 5, "(d)" should be - - (c) - -.

Signed and Sealed this

Twenty-first Day of November, 2000

Attest:

Q. TODD DICKINSON

*Attesting Officer*     *Director of Patents and Trademarks*